Sept. 17, 1957 P. C. COLLURA 2,806,608
COUNTER DISPLAY EASEL
Filed Jan. 28, 1955 6 Sheets-Sheet 1

INVENTOR.
Peter C. Collura
BY
Brown, Jackson, Boettcher & Dienner
Attys.

Sept. 17, 1957 P. C. COLLURA 2,806,608
COUNTER DISPLAY EASEL
Filed Jan. 28, 1955 6 Sheets-Sheet 2
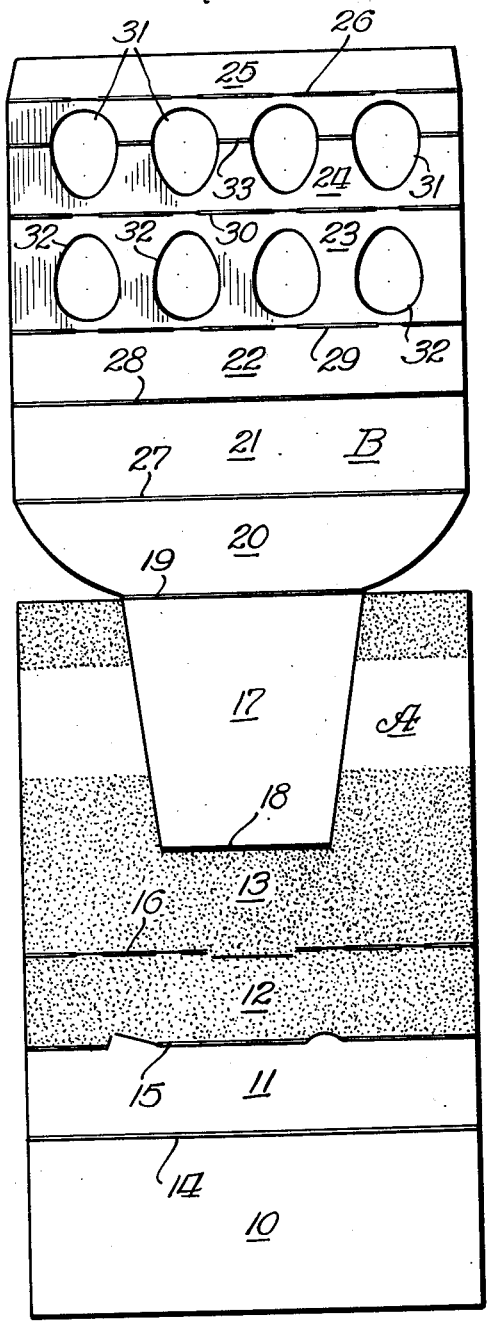
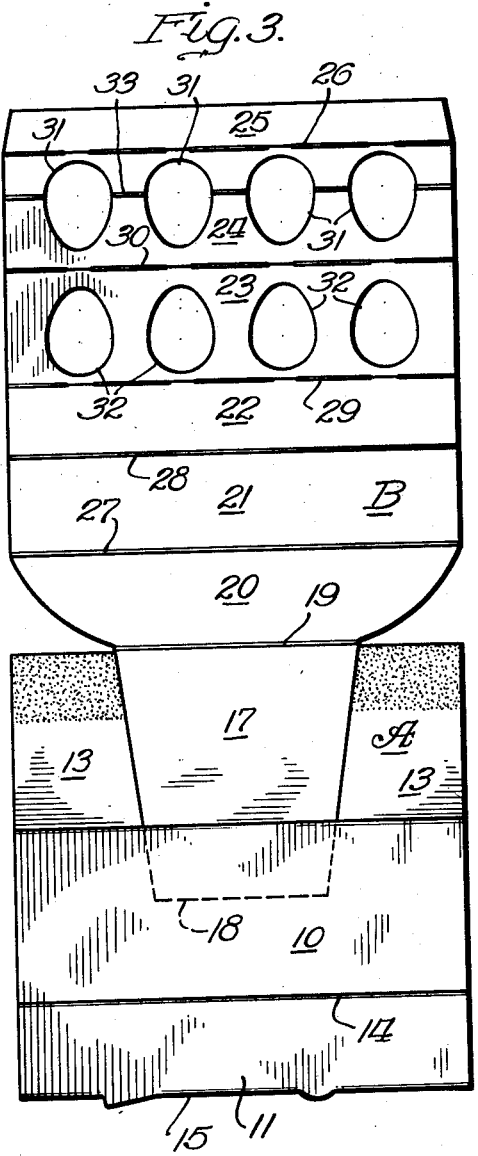
INVENTOR.
Peter C. Collura
BY Sept. 17, 1957  P. C. COLLURA  2,806,608
COUNTER DISPLAY EASEL
Filed Jan. 28, 1955  6 Sheets-Sheet 3

INVENTOR.
Peter C. Collura
BY
Brown, Jackson, Boettcher & Dienner
Attys.

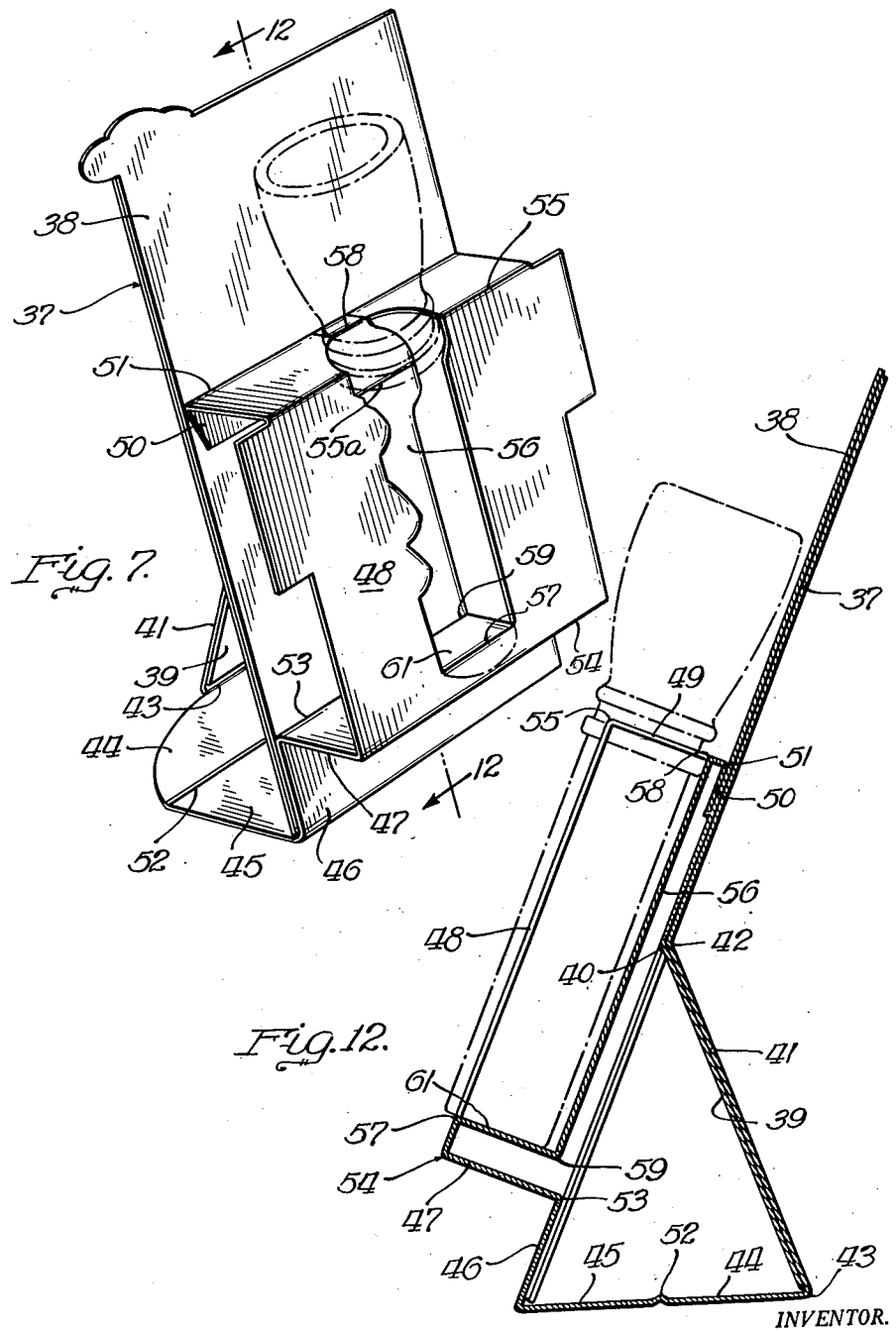

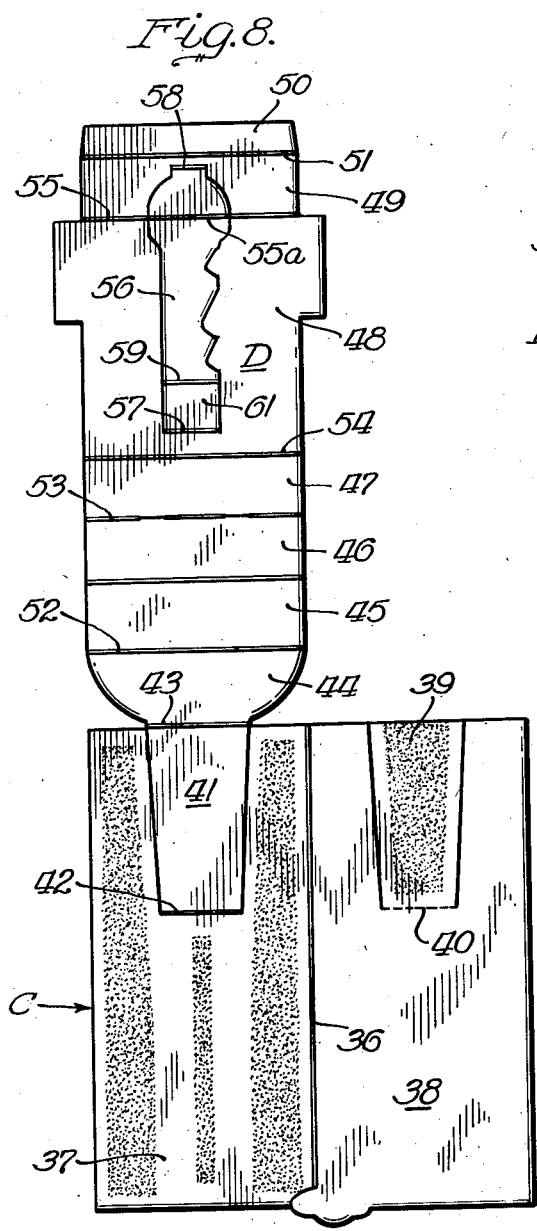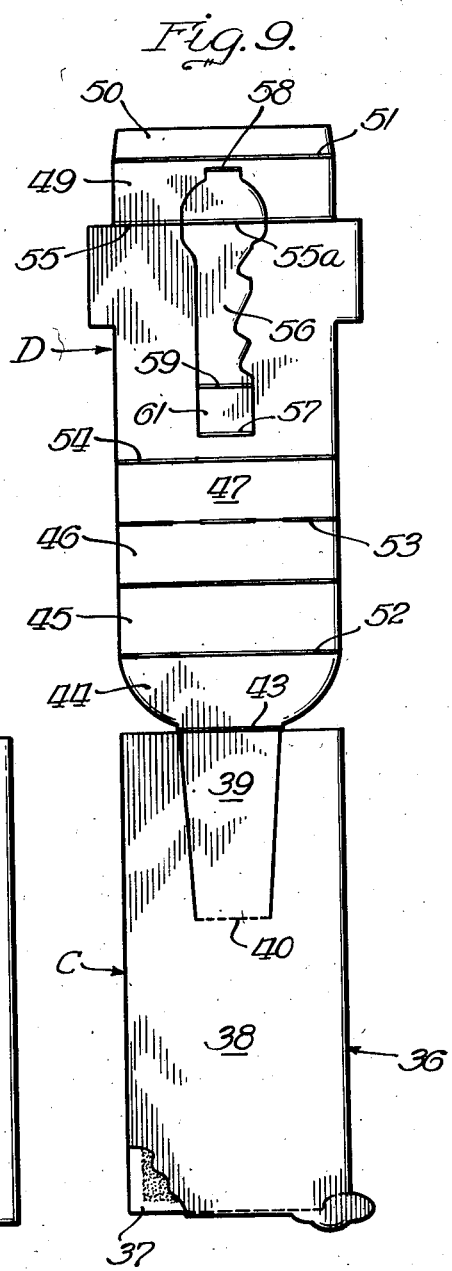

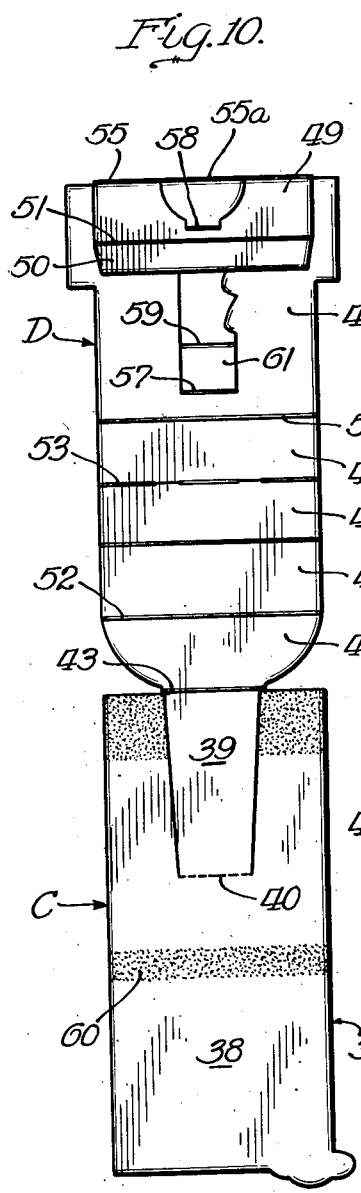
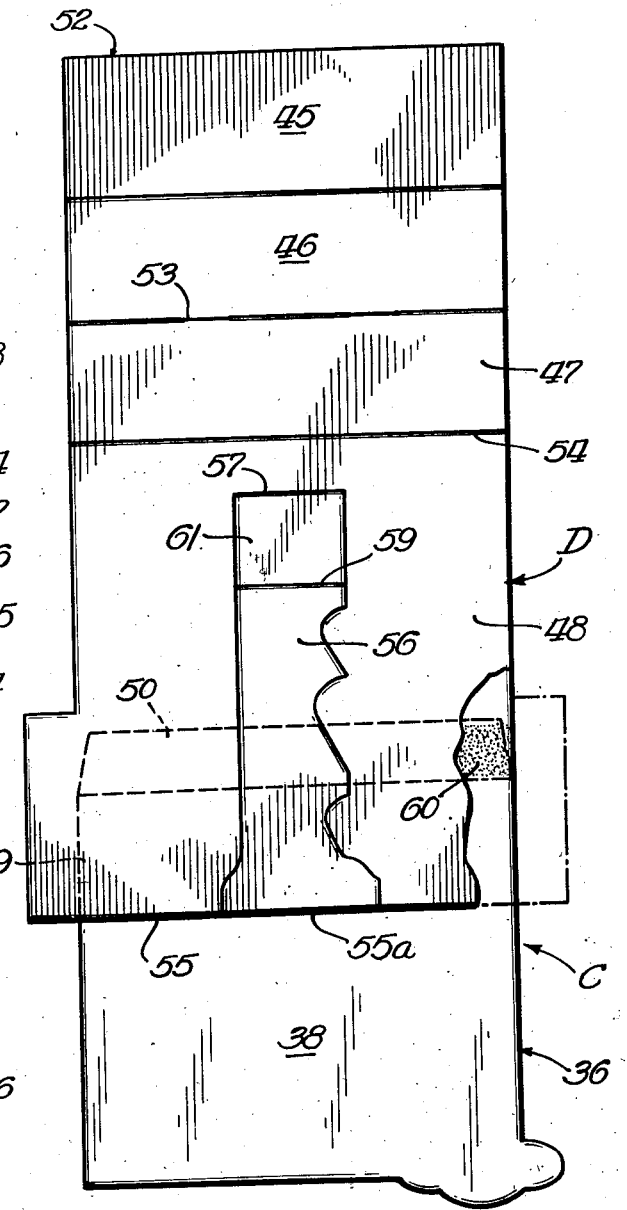

United States Patent Office 2,806,608
Patented Sept. 17, 1957

2,806,608

COUNTER DISPLAY EASEL

Peter C. Collura, Waltham, Mass., assignor to Container Corporation of America, Chicago, Ill., a corporation of Delaware Application January 28, 1955, Serial No. 484,663

4 Claims. (Cl. 211—73)

This invention relates to display devices and has to do with structures in the nature of an easel for displaying on store counters or the like articles of merchandise.

Counter display devices of various sorts are known. In general, all of such devices with which I am familiar require some assembly or adjustment, or both, on the part of the retailer, in setting them up for use, and many retailers refuse to use the known display devices for that reason. My invention is directed to a counter display easel which requires no assembly or adjustment by the retailer in conditioning it for use. The display easel of my invention is formed from a one piece blank of paper board or analogous material, folded into easel form with the elements thereof secured together in proper relation to provide when extended a complete display easel ready for use. The blank is so designed as to assure adequate mechanical strength and rigidity of the easel while avoiding wastage of material and requiring but a few folding operations to produce the easel, which is conducive to low cost of production, an important consideration in this art. Further objects and advantages of my invention will appear from the detail description.

In the drawings:

Figure 2 is a plan view of the blank for the easel of Figure 1;

Figures 3, 4 and 5 are plan views of the blank showing successive steps in the folding of the blank into easel form, Figure 5 being on an enlarged scale;

Figure 7 is a view similar to Figure 1 but showing a modified form of easel for displaying a single flashlight;

Figure 8 is a plan view of the blank for the easel of Figure 7;

Figures 9, 10 and 11 are plan views of the blank of Figure 8 showing successive steps in the folding of the blank into easel form, Figure 11 being on an enlarged scale; and Figure 12 is a sectional view taken substantially on line 12—12 of Figure 7, with the flashlight omitted and indicated in dot and dash lines.

Figures 1, 6:
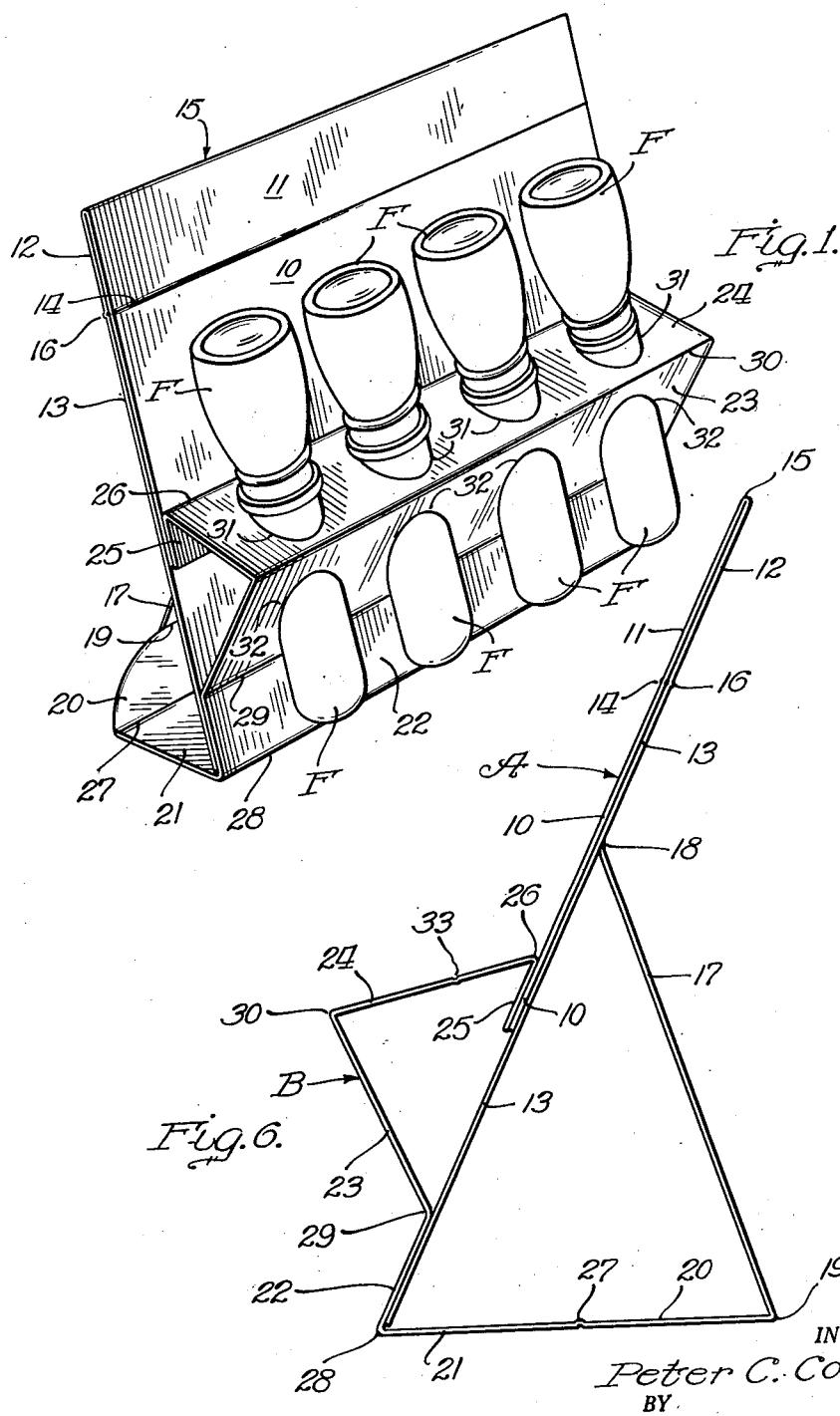
Figure 1 is a perspective view of a display easel embodying my invention, as set up and in use for displaying a plurality of electric flashlights.
Figure 6 is a side view of the easel in set up condition.
Figure 4:
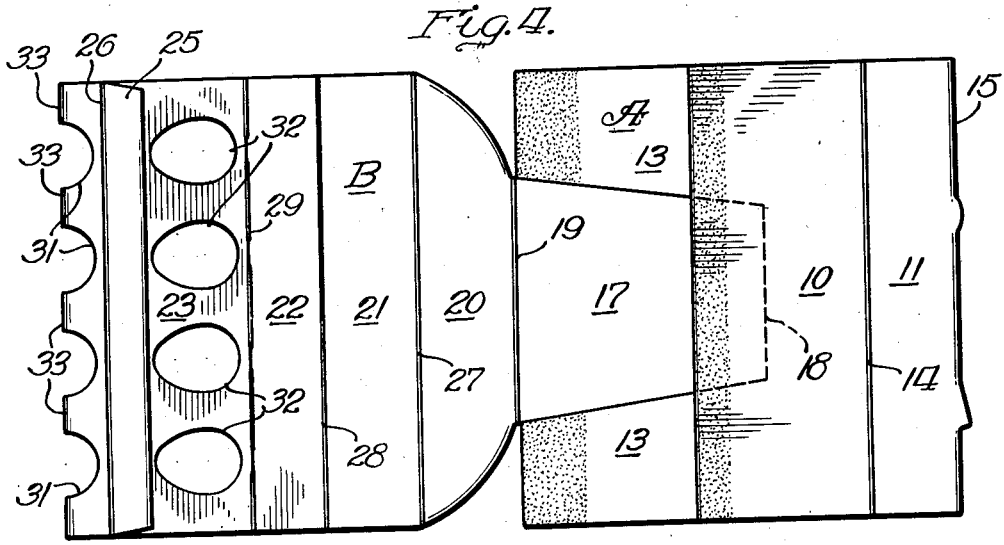

In Figure 1 I have shown the easel of my invention as used for displaying a plurality—four—of electric flashlights, by way of example, but it is to be understood that the easel of my invention may be used for displaying various articles of commerce. In the following the elements of the easel and of the blank from which it is formed will be described with reference to the positions which they occupy in the set up condition of the easel when the latter is used for its intended purpose, with a view to avoiding possible confusion.

The easel of Figure 1 is formed from a paper board blank such as that shown in Figure 2. The blank comprises two sections A and B. Section A is of rectangular shape, as shown, and is suitably cut and scored to provide a plurality of panels 10, 11, 12 and 13, panels 10 and 11 being hingedly connected along a fold line 14, panels 11 and 12 being hingedly connected together along a fold line 15 and panels 12 ad 13 being hingedly connected along a fold line 16 which may be formed by cuts and perforations in the blank, the fold lines 14 and 15 being formed by scoring or creasing of the blank, it being understood that the fold lines may be formed in any suitable known manner. Panel 13 is cut along diverging lines from points upwardly from its lower edge so as to provide, at the midportion thereof, an upwardly tapering brace member 17 hingedly attached at its upper end to panel 13 along a fold line 18.

The lower end of brace member 17 is hingedly attached, along a fold line 19, to section B, which is suitably cut and scored to provide panels 20, 21, 22, 23 and 24, and a glue flap 25 attached to panel 24 along a fold line 26 formed by scoring and slitting the material of the blank. Panels 20 and 21 are hingedly connected along a fold line 27, panels 21 and 22 are hingedly connected along a fold line 28, panels 22 and 23 are hingedly connected along a fold line 29 and panels 23 ad 24 are hingedly connected along a fold line 30, the fold lines 29 and 30 preferably being similar to the fold line 26. The panel 24 is provided with a plurality—four—of ovoidal openings 31 aligned with similar but reversely related openings 32 in the panel 23. The panel 24 is further provided with a fold line 33 extending between the openings 31 and between the end openings 31 and the ends of panel 24, this interrupted fold line 33 being disposed somewhat nearer fold line 26 than fold line 30.

Figure 5:
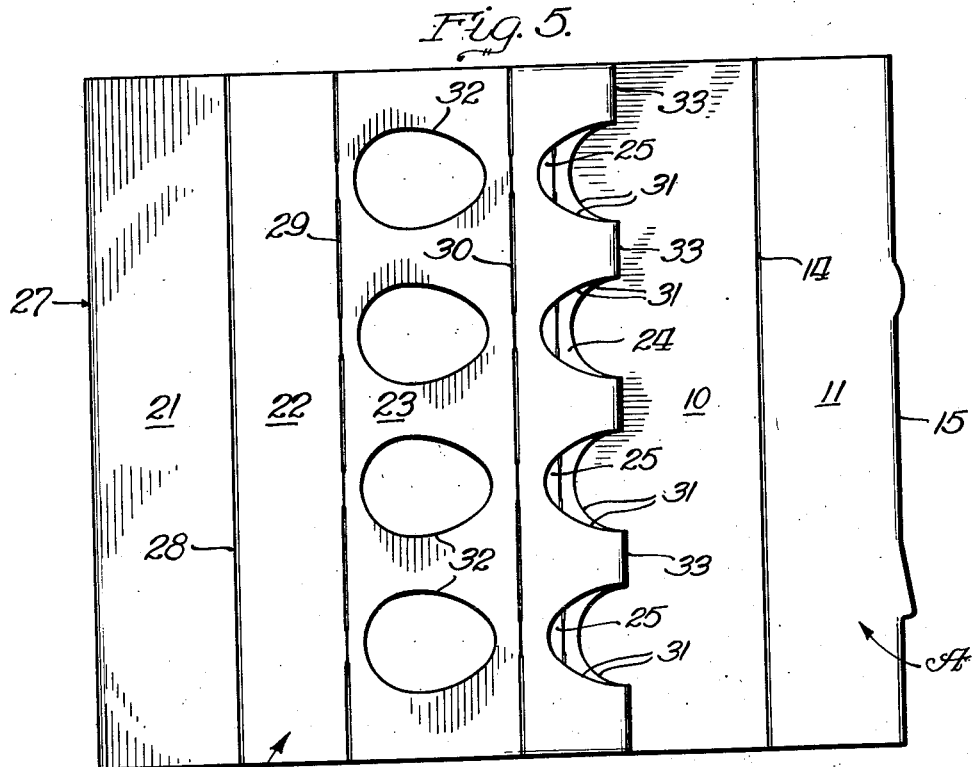

In order to produce the easel of Figure 1 from the blank of Figure 2, the latter is folded and the elements thereof secured together in an appropriate manner. Prior to the first step in the folding operation, the inner face of panel 12 is provided with a coating of glue or adhesive, indicated by the stippling, the upper portion of panel 13 extending about the upper end portion of brace member 17 is provided with a coating of adhesive, indicated by the stippling, and the lower portions of panel 13, at opposite sides of the brace member 17 are also provided with a coating of glue or suitable adhesive indicated by the stippling. The panels 11 and 10 are then folded along the fold line 15 over onto the panel 12 and the upper portion of panel 13, as shown in Figure 3. Thereafter the lower end portion of panel 10 is coated with an adhesive, as indicated by the stippling, for a width corresponding approximately to the width of the glue flap 25, which is folded downward and inward onto the panel 24 along the fold line 33. Section B of the blank is then folded along the fold line 27 onto section A, with glue flap 25 seating on the adhesive coated lower end portion of panel 10 and the end portions of panel 22 seating on the adhesive coated lower end portions of panel 13 at opposite sides of brace member 17. The blank is then held in this folded condition under appropriate pressure until the adhesive has set. The blank thus folded and secured provides the easel shown in its flat folded condition in Figure 5.

In setting up the easel for use, the panels 20 and 21, which are the base panels, may be forced upwardly by exerting pressure on a supporting surface along the fold line 27. That serves to extend the base panels 20 and 21 so as to dispose them in a common plane parallel with the supporting surface, such extension of the base panels serving to swing the brace member 17 rearward so that it is then disposed at an upward and forward inclination to the main panel structure comprising the panels 10 to 13, inclusive. The panels 23 and 24 may then be swung downward and forward about the fold lines 29, 30 and 26 into forwardly converging relation, with the openings 31 and 32 aligned vertically for reception of the articles to be displayed, such as flashlights F, for example, inserted through the aligned openings. The weight of the flashlights suffices to maintain the elements of the easel extended and to hold it in proper set up condition. Preferably the base panels 20 and 21 are of the same width so that the easel may be folded flatwise as in Figure 5 with panel 21 seating on panel 20, the interrupted fold line 33 of panel 24 permitting the panels 23 and 24 to be disposed flatwise upon the panel 13 and the lower portion of panel 10. While preferable, it is not essential that the base panels 20 and 21 be of equal length, provided the extent beyond the lower end of panel 13 of the length of the brace member 17 plus the width of base panel 20 is not greater than the width of base panel 21 so that the blank may be folded flatwise along the fold line 27 in the manner above described. It will be seen that the folded easel is well suited for shipping in its flat folded condition. If desired, however, the easel may be loaded with the flashlights or other articles to be displayed and shipped in loaded condition, in which case the panels 11 and 12 may be bent along the fold lines 14 and 16 into position perpendicular to the panel 13 so as to overlie and protect during shipment the lenses of the flashlights, or to protect other articles loaded in the easel.

The modified form of easel shown in Figure 7 is formed from the blank shown in Figure 8. That blank comprises two sections C and D. Section C is of rectangular shape and is provided with a lengthwise central fold line 36 providing two rectangular panels 37 and 38 hingedly connected together at one side along the fold line 36. Panel 38 is cut from its lower edge to provide a central brace member 39 attached at its upper end to panel 38 along a fold line 40 provided by a row of perforations. Panel 37 is likewise cut from its lower end to provide a central brace member 41 attached at its upper end to panel 37 along a fold line 42 provided by a score or crease in panel 37. Section D is attached at its lower end to the lower end of brace member 41 along a fold line 43 and is scored transversely to provide panels 44, 45, 46, 47, 48 and 49, and a glue flap 50 attached to panel 49 along a fold line 51. Panels 44 and 45 are the base panels, as will appear more fully presently, and are connected together along a fold line 52, panel 46 becomes the lower front panel of the easel and is attached to panel 47 along a fold line 53, panel 47 becomes the bottom panel of a frame which supports the article to be displayed and is attached to panel 48 along a fold line 54, panel 48 becomes the front panel of the frame and is attached to panel 49 along a fold line 55 and panel 49 becomes the top panel of the frame. A strip 56 is cut at its sides from the panels 48 and 49 and is attached to panel 48 at its lower end along a fold line 57 spaced a short distance above the fold line 54, the upper end of strip 56 being attached to panel 49 along a fold line 58 spaced outward or forwardly a short distance from fold line 51. Strip 56 is provided with an upper fold line 55a constituting part of fold line 55 in the blank and with a lower fold line 59 spaced a material distance above fold line 57. The strip 56 corresponds approximately to the outline of the article to be displayed, such as a flashlight, but is provided at one side with indentations approximating the shape of the end portions of the fingers of a hand grasping the searchlight and has at the other side a slight indentation corresponding approximately to the shape of the end of the thumb of the hand; to give the impression of a hand printed on the front face of panel 48 grasping the flashlight.

Preliminary to folding the blank to provide the easel, glue or a suitable adhesive is applied to the inner face of panel 37 at the side and central areas thereof, as indicated by the stippling, and glue is applied to the inner face of brace member 39, as indicated by the stippling. Panel 38 is then folded over onto panel 37 and adhesive is applied to the front face of panel 38 at an area thereof a substantial distance above brace member 40 and of a width approximately the same as that of the glue flap 50, as indicated by the stippling at 60, and glue is also applied to the lower portions of panel 38 at opposite sides of brace member 39 and to a height corresponding to the width or height of panel 46; as shown in Figure 10. Thereafter panel 49, together with glue flap 50, is folded downward and inward onto the inner face of panel 48, as in Figure 10, and section D is folded about fold line 52 onto section C with glue flap 50 seating on area 60 and the end portions of panel 46 seating on the lower adhesive coated areas of panel 38, the parts being appropriately proportioned to that end. The folded blank is then put under appropriate pressure for a suitable length of time until the adhesive has set. That completes the easel which may be shipped to the retailer in its flat folded condition.

In setting up the easel of Figure 7 for use, the retailer presses it downward onto a supporting surface so as to force the base panels 44 and 45 upward and spread them outward into a common plane upon the supporting surface, thus swinging the brace consisting of the members 39 and 41 rearward so as to dispose it at an upward and inward inclination to the main panel structure comprising the panels 37 and 38. The frame, comprising the panels 47, 48 and 49 is then swung downward and forward so as to project outwardly from the main panel structure and the strip 56 is forced rearward into the frame with the portion 61 thereof between the fold lines 57 and 59 extending inward a short distance above and substantially parallel with bottom panel 47 of the frame and providing a support for a search light or other article to be displayed inserted into the opening provided in the frame by rearward displacement of strip 56. In the blank of Figure 8 the base panels 44 and 45 preferably are of equal width, as in the blank of Figure 2, so that the blank may readily be folded flatwise as above described. While it is preferable to have the base panels 44 and 45 of the same or equal width, that is not essential to the broader concept of my invention so long as the extension beyond the lower end of the main panel structure of the length of the brace member plus the width of base panel 44 is the same as the width of base panel 45, in order that the blank may be folded in the manner described.

In both forms of easel disclosed the easel may readily be set up merely by placing it upon a counter or other suitable supporting surface and it is retained in its set up condition by the weight of the articles mounted in the frame projecting forwardly from the main panel structure. There is no necessity for the retailer assembling or adjusting the easel, which is conducive to extensive use thereof. Preferably, though not necessarily, in the blank of Figure 8 the upper portion of panel 48 is of increased width to provide for reception of advertising matter printed on the front face of that panel. In both forms of easel shown the main panel structure is of double thickness for a substantial portion of its extent, being of double thickness for its full extent in the form shown in Figure 7, which imparts desirable strength and rigidity to the structure. The blank, in each form disclosed, is of simple form, avoids excessive waste of material and may readily be formed into the easel by simple gluing and folding operations; which is conducive to low cost of production.

Changes may be made in detail without departing from the field and scope of my invention, and I intend to include all such variations, as fall within the scope of the appended claims, in this application in which the preferred form only of my invention has been disclosed.

I claim:

1. As a new article of manufacture, a counter display easel formed from a one piece paper board blank and comprising a main panel structure formed of two similar panel members secured together face to face, a front panel structure having a lower panel member secured to the lower portion of said main panel structure and a top panel member secured at its rearward edge to said main panel structure along a fold line and supplementary panel members hinged together and to said lower and top panel members providing therewith a frame positionable to extend forwardly from said main panel structure, said frame being adapted for reception of an article to be displayed, said lower panel member extending downward to the lower edge of said main panel structure and providing therewith multiple thickness of paper board at the lower portion of said main panel structure, a base structure comprising a forward base panel hingedly attached at its forward edge along a fold edge to the lower edge of said lower panel member and a rearward base panel hinged at its forward edge to the rearward edge of said forward base panel along a fold line, and a brace member hinged at its upper end to said main panel structure along a fold line and hinged at its lower end to the rearward edge of said rearward base panel along a fold line, said brace member being of a length to extend at an upward and forward inclination to said main panel structure when said base structure is extended with said base panels disposed in a common plane on a supporting surface with said main panel structure extending upwardly therefrom.

2. As a new article of manufacture, a counter display easel formed from a one piece paper board blank and comprising a main panel structure formed of two similar panel members secured together face to face, a front panel structure hingedly attached to said main panel structure positionable to extend forwardly therefrom and adapted for reception of articles to be displayed, said front panel structure having a lower panel member secured to the lower portion of said main panel structure and providing therewith multiple thickness of paper board at the lower portion thereof, said lower panel member extending downward to the lower edge of said main panel structure, a base structure comprising a forward base panel hingedly attached at its forward edge to the lower edge of said lower panel member along a fold line below said main panel structure and a rearward base panel hinged at its forward edge to the rearward edge of said forward base panel along a fold line, and a brace member hinged at its upper end to said main panel structure along a fold line and hinged at its lower end to the rearward edge of said rearward base panel along a fold line, said brace member being of a length to extend at an upward and forward inclination to said main panel structure when said base structure is extended with said base panels disposed in a common plane on a supporting surface with said main panel structure extending upwardly therefrom.

3. As a new article of manufacture, a counter display easel formed from a one piece paper board blank and comprising a main panel structure, means for supporting said main panel structure in upright position comprising a foldable base structure and a brace member hinged at its upper end to said main panel structure along a fold line and hinged at its lower end to said base structure along a fold line, and a front panel structure mounted on said main panel structure comprising an upper panel member secured to said main panel structure providing therewith multiple thickness of paper board, a lower panel member secured to the lower portion of said main panel structure providing therewith multiple thickness of paper board, top and bottom panel members hinged respectively to said upper and lower panel members along fold lines and a front panel member hinged to said top and bottom panel members, said top and bottom and front panel members together defining a frame positionable to extend forwardly from said main panel structure, said top and front panel members being cut to provide a strip attached thereto at its ends along fold lines, said strip having a transverse lower fold line spaced from its lower end and being foldable inward of said frame when the latter is in its extended forward position to provide an opening in said frame for reception of an article to be displayed, the portion of said strip between the lower end thereof and said lower fold line thereof providing an inwardly extending support for an article in said opening.

4. As a new article of manufacture, a counter display easel formed from a one piece paper board blank and comprising a main panel structure, means for supporting said main panel structure in upright position comprising a foldable base structure and a brace member hinged at its upper end to said main panel structure along a fold line and hinged at its lower end to said base structure along a fold line, and a front panel structure mounted on said main panel structure comprising an upper panel member secured to said main panel structure providing therewith multiple thickness of paper board, a lower panel member secured to the lower portion of said main panel structure providing therewith multiple thickness of paper board, and top and bottom panel members respectively hinged to said upper and lower panel members, said front panel structure being positionable to extend forwardly from said main panel structure and adapted for reception of articles to be displayed.

References Cited in the file of this patent

UNITED STATES PATENTS

| | | |
|---|---|---|
| 1,687,138 | Myers | Oct. 9, 1928 |
| 2,206,728 | Nevins | July 2, 1940 |
| 2,285,214 | Lisle | June 2, 1942 |
| 2,524,517 | Cole | Oct. 3, 1950 |